April 11, 1933.   C. A. JOHANSSON   1,903,699
AIR OPERATED VEHICLE CONTROL
Filed May 15, 1929   6 Sheets-Sheet 1

Patented Apr. 11, 1933

1,903,699

UNITED STATES PATENT OFFICE

CARL A. JOHANSSON, OF GOTTENBORG, SWEDEN

AIR OPERATED VEHICLE CONTROL

Application filed May 15, 1929. Serial No. 363,152.

This invention relates to improvements in motor driven vehicles.

An object of the present invention is to provide means operated by air under pressure to start the vehicle motor and to furnish a supply of air for the operation of the motor starting means.

Another object of the invention is the provision of a novel form of clutch for the above purpose, together with air actuated means to control the clutch to drive the compressor from the vehicle motor, or to utilize the compressor as a starting motor for starting said vehicle motor.

Another object of the invention is the provision of an air controlled brake mechanism which may be actuated by air pressure from a storage tank supplied from the compressor, together with air controlled means to force fuel from a fuel supply tank for the operation of the vehicle motor.

With the above and other objects in view, the invention further includes the following novel features and details of construction, to be hereinafter more fully described, illustrated in the accompanying drawings and pointed out in the appended claims.

In the drawings:—

Figure 17 is a like view with the open and closed positions of the valves reversed.

Referring in detail to the drawings wherein like characters of reference denote corresponding parts, the reference character 20 indicates an internal combustion engine whose carburetor is indicated at 21. This engine may be of any suitable type and its operation is started by means of a combined starting motor and air compressor 22 which is illustrated in detail in Figure 6 of the drawings.

Figures 6, 11:
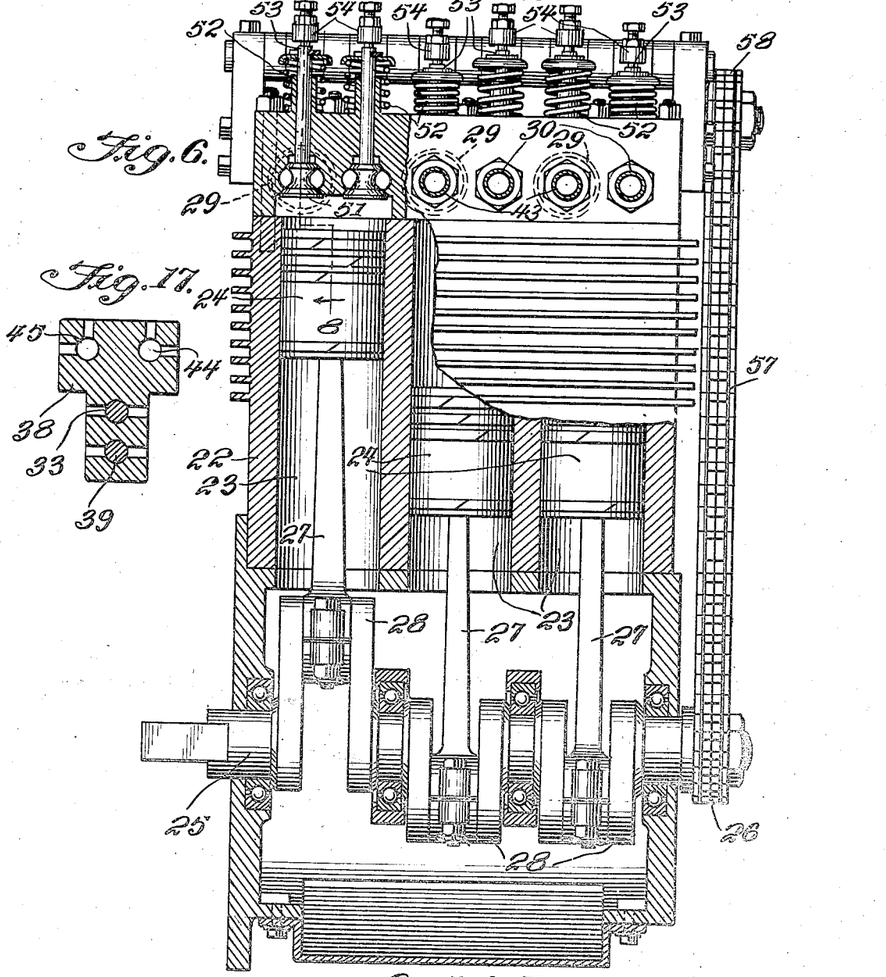
Figure 6 is an enlarged section partly in elevation illustrating the combined compressor and starting motor.
Figure 11 is a sectional view of the brake cylinder and controlling means therefor.
Figure 7:
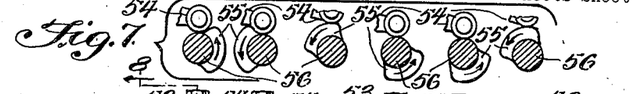
Figure 7 illustrates diagrammatically the position and operation of the valve cams for the combined compressor and starting motor.

This combined starting motor and compressor is shown as comprising a plurality of cylinders 23 within which operate pistons 24, the latter operating a crank shaft 25 which carries at one end a sprocket 26. The pistons are connected to the crank shaft through ordinary rods 27 and the cranks 28 of this shaft are relatively offset one hundred and twenty degrees. Each cylinder of the compressor is provided with an automatic intake valve 29 which is opened upon the in stroke of the piston to suck in air, the air being compressed within the cylinder and forced outward through an exhaust manifold 30 into a pipe 31.

The pipe 31 has connected thereto a branch pipe 32 which is in communication with a normally open valve 33 and this valve is in communication through a pipe 34 with an air storage tank 35. A check valve 36 is included in the pipe 34 and this pipe is connected with the end of the storage tank 35 as shown at 37 in Figure 5 of the drawings.

The valve 33 forms one of a plurality of valves which are contained within a housing 38 and this housing also contains a normally open valve 39 which is open to the atmosphere as shown at 40. The valve 39 is in communication with an intake manifold 41 through a pipe 42 and this manifold is in communication with intake ports 43 provided in the cylinders of the combined starting motor and air compressor 22.

In addition, the housing 38 contains valves 44 and 45, the latter being in communication with the exhaust pipe 31. A pipe 46 extends from the valve 44 and this valve is in communication with the intake pipe 42 of the combined air motor and compressor 22. This last mentioned pipe communicates with the valve 39 through a branch pipe 47.

The valves 33, 39, 44 and 45 are operated by means of a rocker arm 48 which is pivotally mounted as shown at 49 upon the valve housing 38 and this rocker arm is provided with a suitable operating handle 50.

The compressor cylinders are also provided with overhead valves 51 which are held in normally closed position by means of springs 52 which surround their stems 53 and these stems are engaged by rocker arms 54 which are operated by cams 55 upon a shaft 56. The shaft 56 is driven by means of a chain 57 and sprocket 58 from the crank shaft 25.

The crank shaft 25 of the combined motor and compressor 22 is operatively connected with the fly wheel 57 of the engine or motor 20 through the medium of gears 58 and 59, and a clutch 60.

The clutch 60 is contained within a housing within which is mounted a shaft section 61 and a shaft section 62, the latter having secured thereon a gear 59.

The shaft section 61 has mounted for free rotation thereon a worm gear 63 which engages a worm 64 mounted upon a shaft 65. The shaft 65 also has mounted thereon a worm gear 66 which is engaged by a worm 67 mounted upon the shaft 68 and this last mentioned shaft has secured thereon a sprocket wheel 69 which is connected with a sprocket wheel 70 by means of a chain 71. The sprocket wheel 70 is fast upon the shaft section 62.

Splined upon the shaft section 61 is a clutch plate 72, while also splined upon this shaft is a clutch member 73. One end of the clutch member 73 carries teeth 74 which are adapted to engage teeth 75 provided upon the gear 63. These teeth are forced away from one another by means of a spring 76 which is interposed between the clutch member 73 and the clutch plate 72.

The opposite end of the clutch member 73 carries teeth 77 which are adapted to engage teeth 78 carried upon a clutch plate 79. This last mentioned plate is fast upon the shaft section 62 and is freely rotatable upon the shaft section 61.

Mounted upon the housing of the clutch 60 is a cylinder 80 within which operates a plunger 81. This plunger is carried by a stem 82 whose outer end is connected by a link 83 with one end of an arm 84. The opposite end of this arm is secured to a rock shaft 85 to which is secured a yoke 86 and the latter operates within a grooved collar 87 carried by the clutch member 73.

The cylinder 80 communicates with the pipe 42 through a pipe 87' and the rod 82 of the plunger 81 which operates within the cylinder 80 extends into a cylinder 88 which is disposed in alignment with the cylinder 80. Operating within the cylinder 88 is a plunger 89 having a bore 90 which loosely receives the end of the rod 82. The cylinder 88 has extending therefrom a pipe 89a and the latter is provided with a branch pipe 90' which leads to a valve 91 mounted upon the air storage tank 35. This valve 91 is in communication with a valve 92 through the medium of a pipe 93.

Figures 1, 3, 4, 5:
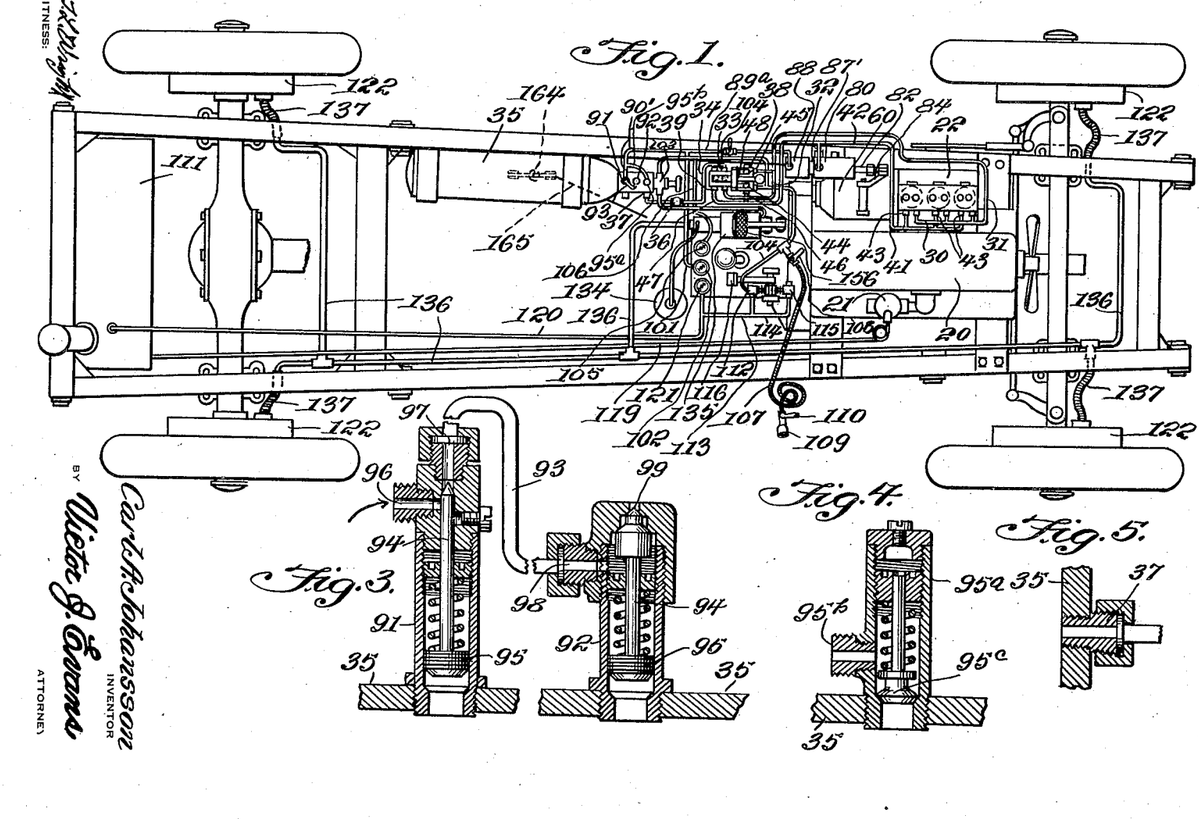
Figure 1 is a plan view of the chassis of a motor vehicle equipped with the invention.
Figure 3 is an enlarged sectional view of the clutch controlling valves for controlling the operation of the compressor.
Figure 4 is a like view of the clutch controlling valve for operating the compressor as a starter.
Figure 5 is a detail sectional view.

The valves 91 and 92 are shown in detail in Figure 3 of the drawings and each includes a spring influenced valve member 94 and a plunger 95. The valve 91 is provided with an intake port 96 through which the branch pipe 90' communicates with said valve, while an outlet port 97 is in communication with one end of the pipe 93. The opposite end of the pipe 93 communicates with the intake port 98 of the valve 92 while the outlet port 99 of this last mentioned valve is open to the atmosphere.

The combined air motor and compressor 22 is initially operated to store air in the cylinder 35 by means of the motor or engine 20. When air within the tank 35 falls below a predetermined pressure, the valves 91 and 92 will open due to the relief of pressure against the plungers 95 which permits the springs of these valves to force the plungers downward and provide communication between the ports 96 and 97 and 98 and 99. This opening of the valves 91 and 92 will permit of the escape of air from the cylinder 88 through the pipe 89a and the branch pipe 90'. Pressure is then relieved from the plunger 89 within the cylinder 88, whereupon the tension of the spring 100, which connects the arm 84 with the cylinder 80, forces the rod 82 inward and moves the clutch member 73 toward the compressor 22. This action forces the clutch plate 72 to engage the gear 63 while the teeth 75 of this gear and the teeth 74 of the clutch member will also engage and lock the gear 63 to the shaft section 61. The motor 20 will then operate through the gear 58 on the fly wheel 57 to drive the gear 59 and this gear will drive the sprocket chain 71, the shaft 68, the shaft 65, the gear 63 and the shaft section 61 which is connected to the crank shaft 25 of the compressor.

The compressor will then draw air in through the valves 29 and 51 so that the compressed air will be forced outward through the exhaust manifold 30, the pipe 31, the pipe 32, the valve 33 (which is normally open) the pipe 34 and the check valve 36 into the tank 35.

A branch pipe 101 extends from the pipe 89a and is provided with a pressure indicating gage 102.

In order to permit the plunger rod 82 to operate in the manner described and operate the clutch member 73, air is exhausted from the cylinder 80 through the pipe 87', the pipe 47 and the valve 39 which is normally open. When the combined air motor and compressor 22 is operating to compress air for storage in the tank 35, air is drawn into the cylinders of the compressor 22 through the intake valves 39, intake manifold 41, pipes 42 and 47, valve 38 and port 40.

Figures 8, 10, 16:
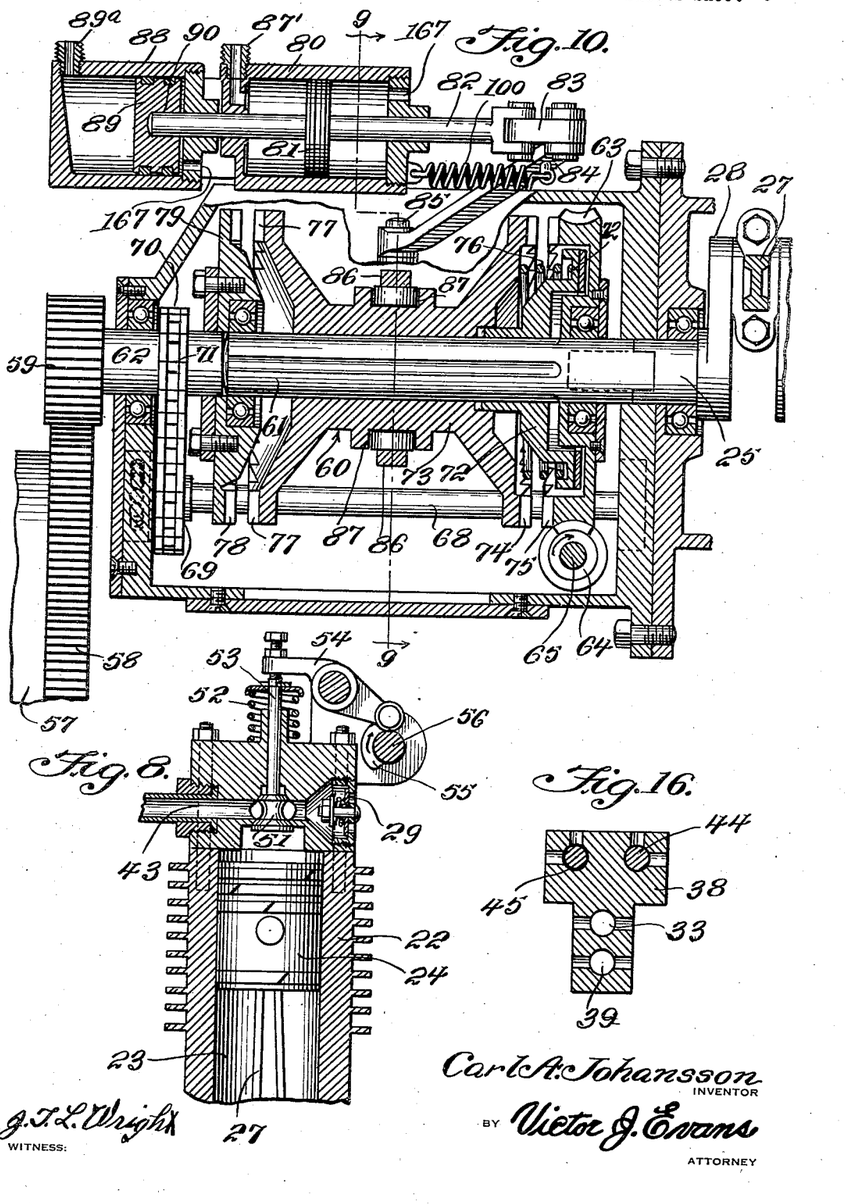
Figure 8 is a sectional view on line 8—8 of Figure 6.
Figure 10 is a section on the line 10—10 of Figure 9.
Figure 16 is a fragmentary sectional view of the manually operated multiple valve showing two of the valves closed and two of the valves open.

As soon as air pressure within the tank 35 insufficient to close the valves 91 and 92, air within the cylinder 88 will act on the plunger 89 to force the rod 82 toward the compressor 22 so that the clutch will assume a neutral position as shown in Figure 10 of the drawings.

In order to restore air to the cylinder 88, the tank 35 is provided with a valve 95a which is in communication with the pipe 89a through a branch pipe 95b. This valve 95a includes a spring influenced valve member 95c which is unseated when pressure within the tank 35 reaches a predetermined degree. The valve member 95c however is not unseated until after the valve members 94 of the valves 91 and 92 are seated. This is due to the fact that the spring of the valve 95c is stronger than the springs of the valves 91 and 92. It will thus be seen that after the valves 91 and 92 are closed and pressure within the tank 35 continues to increase, the valve 95a will be open and pressure will be restored within the tank 88 to move the plunger 89 in this tank to neutral position, as shown in Figure 10.

The plunger rod 82 is at the limit of its stroke in this figure under the action of the plunger 89. However, the rod 82 may move further in a direction toward the compressor 22 under the action of air upon the plunger 81 within the cylinder 80.

In order to operate the combined air motor and compressor 22 to start the operation of the motor 20, the rocker arm 48 is operated to close the valves 33 and 39 and open the valves 44 and 45. When this occurs air controlled by a manually operated valve 103 will pass from the tank 35 through a pipe 104, the pipe 46, the valve 44, the pipe 42, the intake manifold 41 into the cylinders of the combined air motor and compressor 22. Air will exhaust from these cylinders through the pipe 31 and the valve 45, the valves 33 and 39 being closed. At the same time, air from the pipe 42 will pass through the pipe 87' into the cylinder 80 and act upon the plunger 81 to force the rod 82 further toward the compressor 22, this further movement being permitted by the loose connection between the rod 82 and the plunger 89. This further movement will move the clutch member 73 to the left of the position shown in Figure 10 of the drawings so that the clutch member will engage the clutch plate 79. The motor 20 will then be driven from the starting motor 22 directly through the shaft section 61, the clutch member 73, the clutch plate 79, the shaft section 62 and the gears 59 and 58.

A pressure indicating gage 105 is connected by means of a pipe 106 with the pipe 104.

The pipe 104 is in communication with a flexible pipe or hose 107. The inner end of this pipe or hose is provided with a manually operated valve 108 so as to admit or cut off pressure. The outer end of the pipe is provided with a valve 109 such as is commonly used for the inflation of automobile tires. An additional manually operated valve 110 is provided at the outer end of the hose 107. Pressure from the tank 35 may thus be utilized to inflate the tires of the automobile.

In addition, air from the tank 35 is utilized to force gasoline from the gasoline supply tank 111 to the carburetor 21. For this purpose, the pipe 104 is provided with a spring influenced valve 112 which controls communication through a pipe 113 to the tank 111. The pipe 113 has extending therefrom a branch pipe 114 which is provided with a spring influenced exhaust valve 115. The valves 112 and 115 are controlled by a lever 116 which is mounted on a rock shaft 117 and this shaft has secured thereon an arm 118 which is located between the valves 112 and 115.

Figure 2:
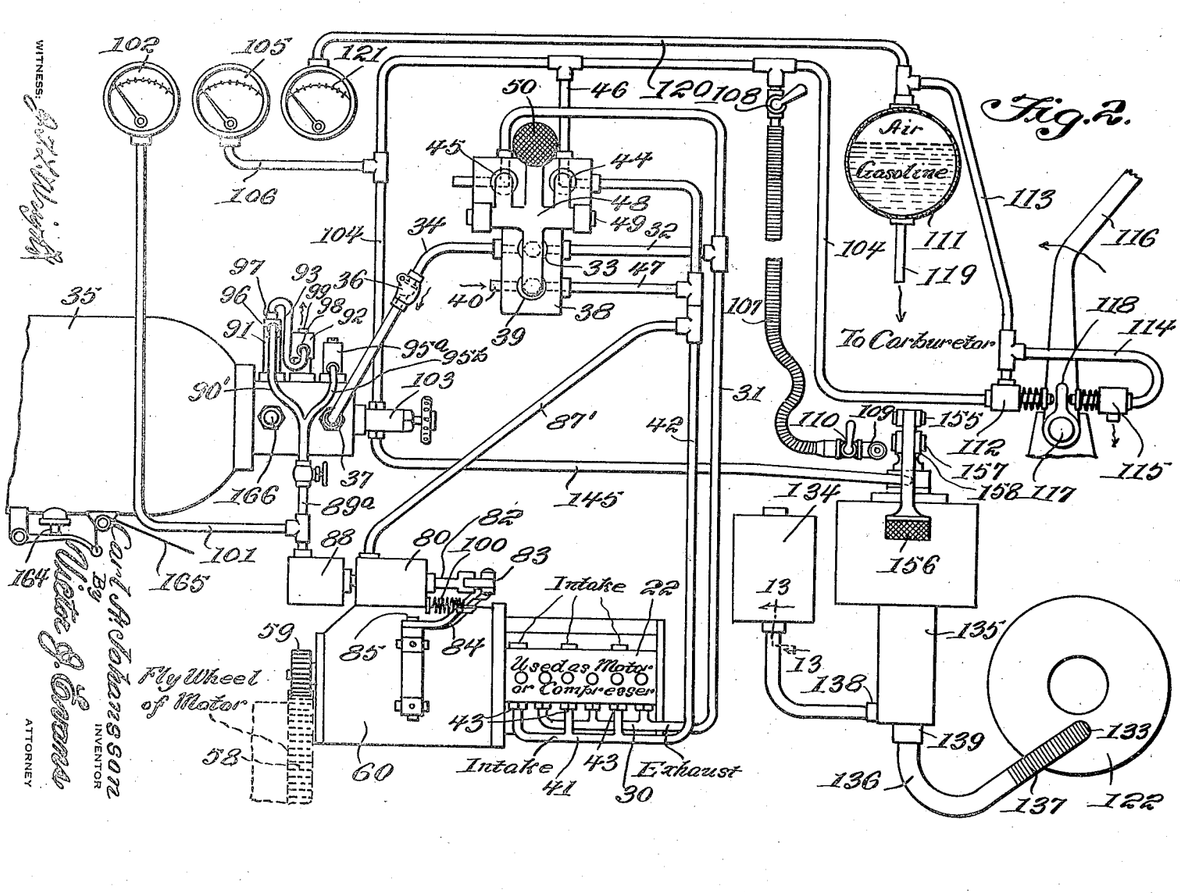
Figure 2 is an enlarged diagram illustrating the invention.

By moving the lever 116 in the direction of the arrow shown in Figure 2, the valve 112 will be opened to admit air to the tank 111 so as to force the gasoline to the carburetor through a pipe 119. By moving the lever 116 in a reverse direction, the valve 115 may be opened to exhaust air from the tank 111.

The pipe 113 communicates with the tank 111 through a pipe 120 and this pipe is provided with a pressure indicating gage 121. The amount of pressure within the tank 111 may thus be determined and controlled through the operation of the lever 116.

Figures 9, 14, 15:
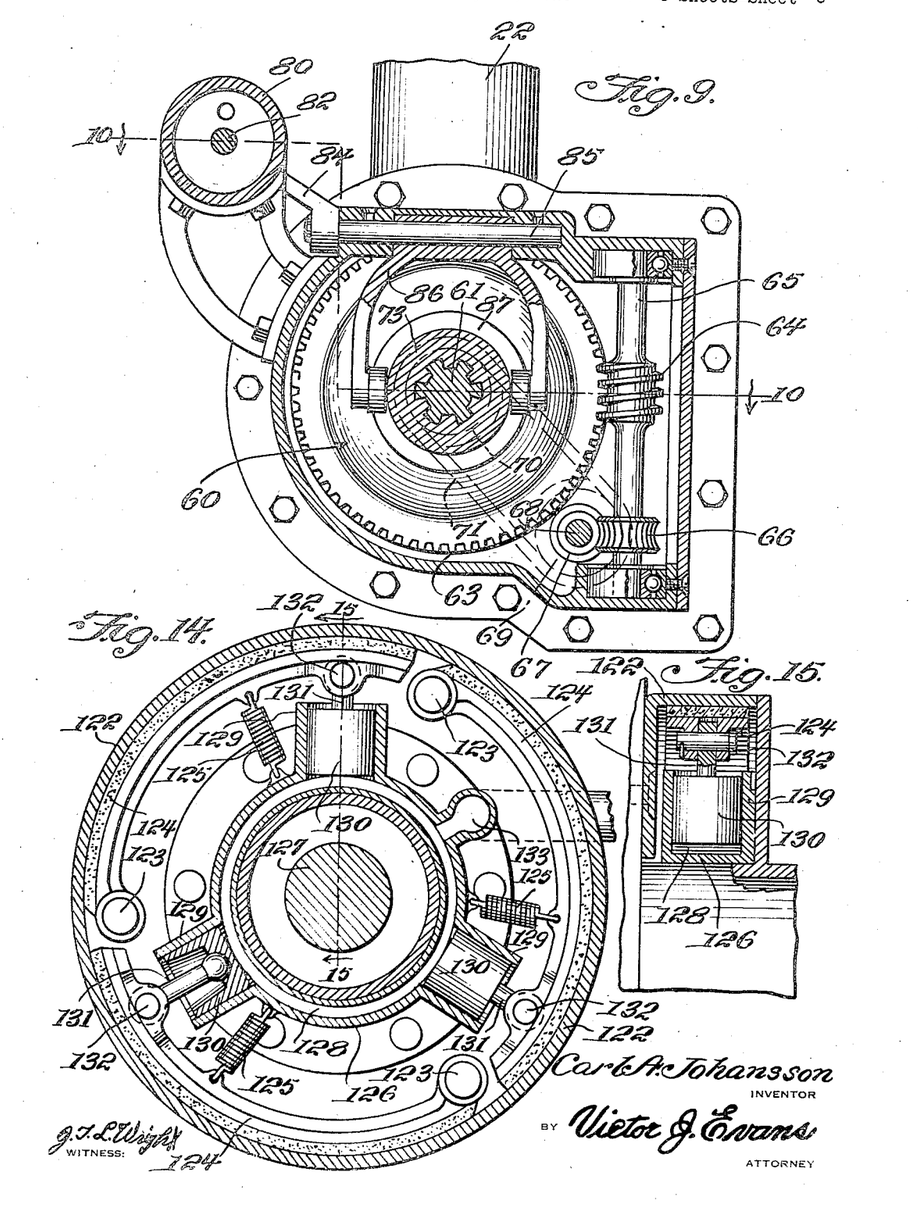
Figure 9 is a sectional view of the clutch, the section being taken substantially on the line 9—9 of Figure 10.
Figure 14 is an enlarged sectional view showing one of the brakes.
Figure 15 is a section taken substantially on the line 15—15 of Figure 14.

The invention further provides air operated means for operating the brakes of the automobile, the brakes being of the internal expanding hydraulic type. As shown in Figure 14 of the drawings, the brake drum which is indicated at 122 has pivotally mounted therein as shown at 123, brake shoes 124. These shoes are normally disengaged from the drum 122 by means of springs 125 which connect the shoes with an annular member 126 surrounding the axle 127 of the automobile. This annular member 126 is provided with an annular passage 128 which communicates with cylinders 129 which are open at each end and which are disposed radially of the axle 127. Operating within the cylinders 129 are pistons 130 whose rods 131 are connected with the brake shoes 124 as shown at 132.

Fluid is admitted to the passage 129 through an inlet port 133 and acts upon the pistons 130 to force said pistons outward and engage the brake shoes with the brake drum as will be clearly shown from Figures 14 and 15 of the drawings.

Fluid such as glycerine or the like is supplied to the brakes from a supply tank 134 through a brake cylinder 135 and the latter is in communication with the passages 128 of the brakes through pipes 136 and flexible hose 137.

Figures 11, 12, 13:
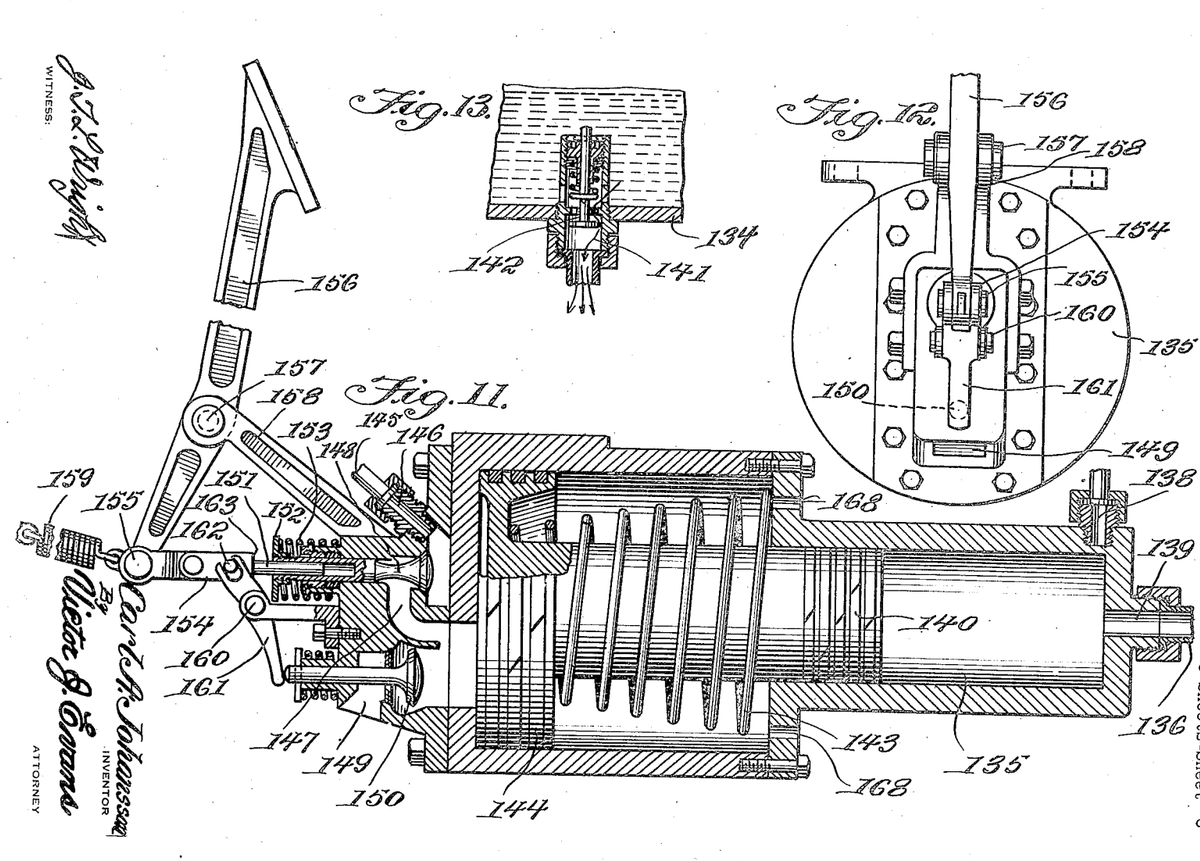
Figure 12 is an end view of the cylinder.
Figure 13 is an enlarged fragmentary sectional view taken substantially on the line 13—13 of Figure 2.

For the purpose of controlling the supply of fluid to the brakes, the brake cylinder 135 is provided at one end with an inlet port 138 which is in communication with the tank 134 and with an outlet port 139 which is in communication with the passages 128 within each of the brake drums. Operating within the cylinder 135 is a piston or plunger 140 which, as shown in Figure 11 of the drawings, operates to force fluid from this cylinder to the brakes. In order to prevent back flow of fluid from the cylinder 135 to the tank 134, the outlet port 141 of this tank is provided with a spring influenced check valve 142, Figure 13, so that when the piston or plunger 140 moves to the right as shown in Figure 11 of the drawings, fluid from the cylinder 135 will be forced outward through the port 139 and the distributing pipes 136 to the brakes.

The piston or plunger 140 is normally held in retracted position by means of a spring 143 and this piston or plunger is provided with a head 144 against which the spring bears. Air is supplied to the cylinder 135 through a pipe 145 which leads from the valve 103 of the tank 35 and enters the cylinder 135 through an inlet 146. The port 146 communicates with an inlet passage 147 which is controlled by an inlet valve 148 so that when this valve is closed no air will be admitted to the cylinder 135. The cylinder is provided with an exhaust passage 149 which is controlled by a spring influenced valve 150.

The valve 148 has its stem provided with a bore within which operates a rod 151, while the outer end of the stem of the valve 148 carries a flange 152. A spring 153 which is interposed between this flange and the end of the cylinder 135 acts to yieldingly hold the valve 148 in closed position.

The rod 151 is formed by an extension of a rod 154 and pivotally connected to this rod as shown at 155 is a foot pedal or lever 156, the latter being mounted for pivotal movement as shown at 157 upon the outer end of an arm 158 which is carried by the cylinder 135. A spring 159 acts to yieldingly resist pivotal movement of the foot pedal 156 and inward movement of the rod 154.

Pivotally mounted as shown at 160 is a lever 161. One end of this lever bears against the outer end of the stem of the valve 150 while the opposite end of this lever is bifurcated to engage a pin 162 which is carried by the rod 154.

Normally the parts are arranged as shown in Figure 11, the brakes being released. Pressure upon the foot pedal 156 will move the rod 154 inward against the action of the spring 159 and this initial movement will rock the lever 161 upon its pivot and permit the valve 150 to close under the action of its spring. No movement of the valve 148 will occur until the shoulder 163 provided upon the rod 154 engages the flange 152 at the outer end of the stem of the valve 148. Continued movement of the foot pedal 156 will then unseat the valve 148 against the action of its spring 153 and permit air to pass into the cylinder 135 through the inlet passage 147. This admitted air will act upon the head 144 of the plunger or piston 140 so that the latter will be moved to force the fluid to the brakes as previously explained.

A valve 164 is provided upon the tank 35 and this valve is manually operated by means of a cord or other flexible element 165, for the purpose of discharging water and oil which might enter the tank through the pipe 34 from the combined motor and compressor 22. Danger of explosion through compression of a mixture of air and oil vapor in the tank is thus avoided.

Excessive pressure within the tank 35 is relieved by means of a suitable automatic relief valve 166.

The cylinders 88 and 135 are provided with air escape ports 167 and 168 respectively to prevent compression between the ends of these cylinders and their pistons 82 and 144.

The invention is susceptible of various changes in its form, proportions and minor details of construction and the right is herein reserved to make such changes as properly fall within the scope of the appended claims.

Having described the invention what is claimed is:—

1. In combination with an engine and a combined compressor and starting motor and an air storage tank, a clutch between the engine and combined compressor and starting motor, an air inlet pipe establishing communication between the atmosphere and the intake manifold of said compressor and starting motor, an air outlet pipe leading from the exhaust manifold thereof, a branch pipe extending from said air outlet pipe and communicating with said storage tank, a check valve in said branch pipe, clutch operating means including a pair of aligned cylinders, pistons operating therein, a piston rod connecting said pistons, valve controlled communication between the storage tank and one of said cylinders, and an exhaust pipe leading from the other of said cylinders and communicating with said air inlet pipe.

2. In combination with an engine and a combined compressor and starting motor and an air storage tank, a clutch between the engine and said combined compressor and starting motor, an air inlet pipe communicating with the intake manifold of said compressor and starting motor, a housing supporting said pipe and a valve therefore, said pipe including a branch pipe supported by the housing and opening to the atmosphere, a normally open valve therefor supported by said housing, a second branch pipe leading from the first mentioned valve and communicating with the aforementioned branch pipe, an air outlet pipe leading from the exhaust manifold of the compressor and starting motor and supported by said housing, a valve therefor mounted on said housing, a branch pipe extending from said outlet pipe and communicating with said storage tank, a check valve in the last mentioned pipe, a rocker arm mounted on said housing and including branches for operating the valve supported thereon, clutch operating means including a pair of aligned cylinders, pistons operating therein, valve controlled communication between the storage tank and one of said cylinders, and an exhaust pipe leading from the other of said cylinders and communicating with said air inlet pipe.

In testimony whereof I affix my signature.

CARL AMBRASIUS JOHANSSON.